_(12)_ United States Patent
Ramaswamy

(10) Patent No.: US 8,135,041 B2
(45) Date of Patent: Mar. 13, 2012

(54) MULTIPLE CLOSED CAPTIONING FLOWS AND CUSTOMER ACCESS IN DIGITAL NETWORKS

(75) Inventor: Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 619 days.

(21) Appl. No.: 11/792,009

(22) PCT Filed: Jul. 14, 2005

(86) PCT No.: PCT/US2005/025035
§ 371 (c)(1),
(2), (4) Date: May 30, 2007

(87) PCT Pub. No.: WO2006/062553
PCT Pub. Date: Jun. 15, 2006

(65) Prior Publication Data
US 2008/0018791 A1    Jan. 24, 2008

Related U.S. Application Data

(60) Provisional application No. 60/633,473, filed on Dec. 6, 2004.

(51) Int. Cl.
*H04L 12/28* (2006.01)
(52) U.S. Cl. ........................ 370/487; 370/529
(58) Field of Classification Search .......... 370/230, 370/231, 235, 389, 392, 400, 401, 419, 463, 370/487, 490, 527, 529
See application file for complete search history.

(56) References Cited

U.S. PATENT DOCUMENTS

| 5,400,401 | A | * | 3/1995 | Wasilewski et al. | 380/212 |
|---|---|---|---|---|---|
| 6,321,383 | B1 | | 11/2001 | Funahashi et al. | |
| 6,412,011 | B1 | * | 6/2002 | Agraharam et al. | 709/231 |
| 2002/0083464 | A1 | * | 6/2002 | Tomsen et al. | 725/112 |
| 2002/0089606 | A1 | * | 7/2002 | Forler et al. | 348/569 |
| 2002/0186320 | A1 | * | 12/2002 | Carlsgaard et al. | 348/468 |
| 2003/0179283 | A1 | * | 9/2003 | Seidel et al. | 348/14.01 |
| 2003/0221198 | A1 | | 11/2003 | Sloo | |
| 2005/0132420 | A1 | * | 6/2005 | Howard et al. | 725/135 |
| 2005/0172315 | A1 | * | 8/2005 | Chen | 725/39 |

(Continued)

FOREIGN PATENT DOCUMENTS

EP    0660602    6/1995

(Continued)

OTHER PUBLICATIONS

European Search Report.

(Continued)

*Primary Examiner* — Hassan Phillips
*Assistant Examiner* — Duc Duong
(74) *Attorney, Agent, or Firm* — Jeffrey D. Hale; Robert B. Levy; Robert D. Shedd

(57) ABSTRACT

There are provided a customer premise equipment (CPE) device, a corresponding method, and a Digital Subscriber Line Access Multiplexer (DSLAM) for connecting to a digital network. The CPE device includes a user input device for receiving a user input specifying one or more channels for which closed caption (CC) information is sought. The CPE device also includes a decoder for receiving the CC information for the one or more channels specified by the user input.

16 Claims, 3 Drawing Sheets

U.S. PATENT DOCUMENTS

2006/0039367 A1\* 2/2006 Wright et al. ................ 370/382

FOREIGN PATENT DOCUMENTS

| EP | 1971283 | 1/2001 |
|---|---|---|
| JP | 7222072 | 8/1995 |
| JP | 9046690 | 2/1997 |
| JP | 1013809 | 1/1998 |
| WO | WO98/27725 | 6/1998 |
| WO | WO02/104001 | 12/2002 |
| WO | WO03081917 | 10/2003 |

OTHER PUBLICATIONS

European Search Report dated Mar. 24, 2010.
European Search Report, Apr. 2005.

\* cited by examiner

MULTIPLE CLOSED CAPTIONING FLOWS AND CUSTOMER ACCESS IN DIGITAL NETWORKS

CROSS-REFERENCE TO RELATED APPLICATIONS

This application claims the benefit, under 35 U.S.C. §365 of International Application PCT/US2005/025035, filed Jul. 14, 2005 which was published in accordance with PCT Article 21(2) on Jun. 15, 2006 in English and which claims the benefit of U.S. provisional patent application No. 60/633,473 filed Dec. 6, 2004.

FIELD OF THE INVENTION

The present invention relates generally to digital networks and, more particularly, to a method and apparatus for multiple closed captioning flows and customer access in digital networks.

BACKGROUND OF THE INVENTION

Closed captioning (CC) information in digital broadcasting systems in usually carried as data information. There are, however, time constraints on when the CC information needs to be displayed or integrated with the video on the screen. In principle, this is similar to the audio track that is maintained synchronous with a video track using a variety of time stamping mechanisms, and so forth. In a broadcast system, CC information for all channels are carried in the transponder or channel and then tuned in similar to audio. In a digital network such as a Digital Subscriber Line (DSL) network, no mechanisms exist to treat the CC information in a manner similar to audio.

Accordingly, it would be desirable and highly advantageous to have a method and apparatus for managing CC information in digital networks.

SUMMARY OF THE INVENTION

These and other drawbacks and disadvantages of the prior art are addressed by the present invention, which is directed to a method and apparatus for multiple closed captioning flows and customer access in digital networks.

According to an aspect of the present invention, there is provided a customer premise equipment (CPE) device for connecting to a digital network. The CPE device includes a user input device for receiving a user input specifying one or more According to an aspect of the present invention, there is provided a customer premise equipment (CPE) device for connecting to a digital network. The CPE device includes a user input device for receiving a user input specifying one or more channels for which closed caption (CC) information is sought. The CPE device also includes a decoder for receiving the CC information for the one or more channels specified by the user input.

According to another aspect of the present invention, there is provided a Digital Subscriber Line Access Multiplexer (DSLAM) for connecting to a Digital Subscriber Line (DSL) network. The DSLAM includes a selection multiplexer for receiving a plurality of closed caption (CC) signals for a plurality of media content, and for selecting at least one of the plurality of CC signals to respectively send to each of a plurality of Customer Premise Equipment (CPE) devices connected thereto in response to a user input received from the CPE.

According to yet another aspect of the present invention, there is provided a method for receiving closed caption (CC) information in a customer premise equipment (CPE) device for connecting to a digital network. The method includes the step of transmitting a user input, from the CPE to another device in the digital network, specifying one or more channels for which closed caption (CC) information is sought. The method also includes the step of receiving the CC information for the one or more channels specified by the user input.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
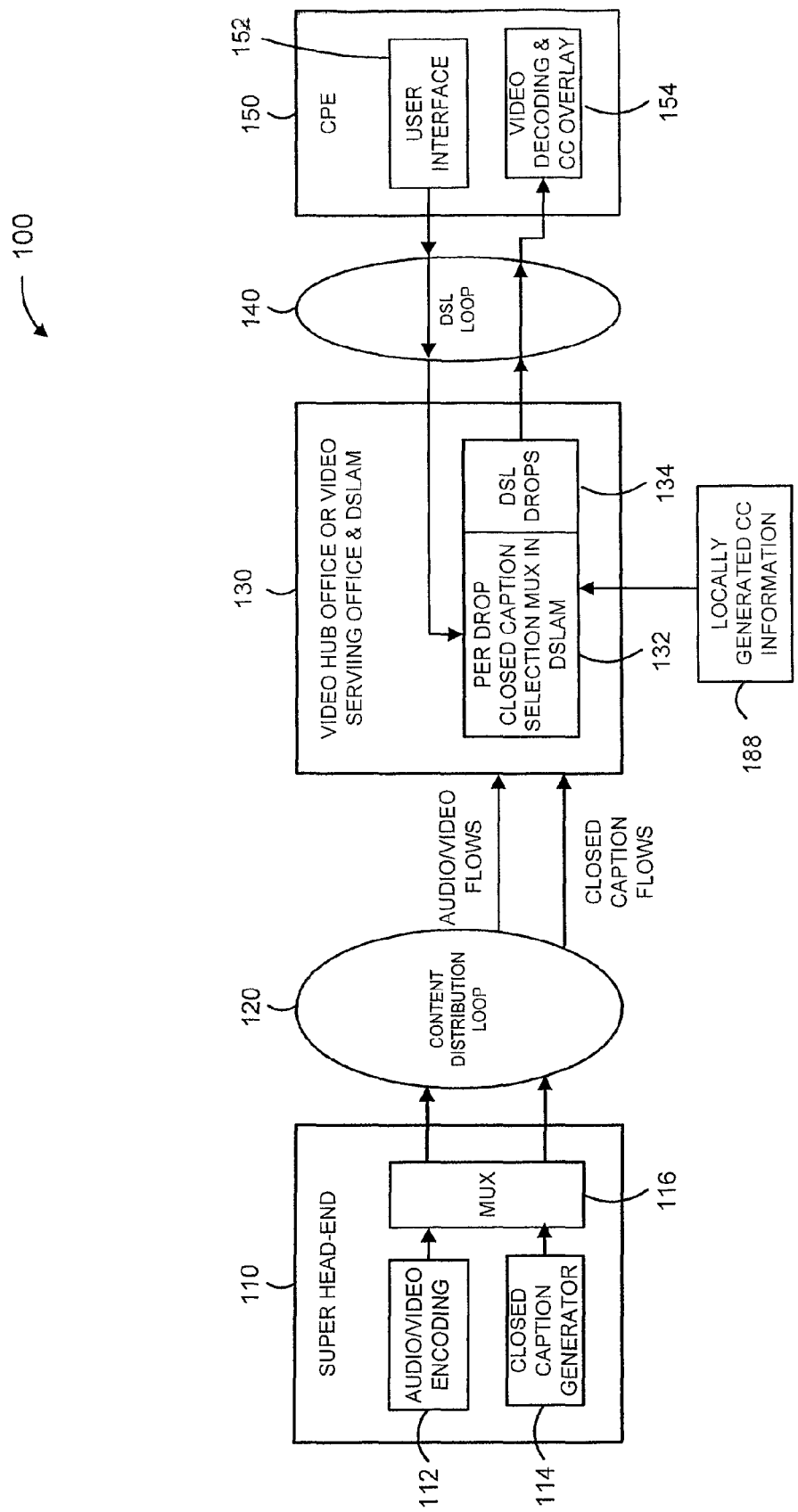
FIG. 1 is a block diagram illustrating an exemplary digital subscriber line (DSL) network in accordance with the principles of the present invention.

The present invention is directed to a method and apparatus for multiple closed captioning flows and customer access in digital networks.

Advantageously, the present invention provides, e.g., in a DSL system, Closed Captions (CC), including CC in multiple languages, to be maintained as a separate flow until the DSLAM and switched in on request for both the main channel and PIP channels. Also, the closed caption information along with the video data can be sent to the CPE and selected at the CPE based upon which CC information needs to be displayed. Based on the requirements of the service operator, audio signals for the main and PIP channels can be treated in a variety of methods with greater flexibility than is possible in current analog systems. Closed captioning for the PIP channel, for example, can be offered as a feature on the main channel display.

Thus, the present invention provides a flow mechanism to present CC information to the Customer Premises equipment. CC information for each channel is maintained as a separate flow up to the DSLAM (or an upstream point in the network that instruments the switching of a broadcast channel to a specific user). At the DSLAM (or appropriate switch point), a CC stream can be chosen for display with the normal or PIP channel. Generalizing further, it will be even possible to switch any CC information belonging to any arbitrary channel to be overlaid with the main channel being viewed. For example, one exemplary application of many to which the present invention may be applied, given the teachings of the present invention provided herein is if a consumer is watching a football game but would like to get information on another basketball game available on a different channel. In accordance with the principles of the present invention, the CC of the basketball game is requested to be overlaid on the currently watched football game channel. Of course, in accordance with the principles of the present invention, it would also be possible to view the CC information of the PIP channel on the main channel.

It is to be appreciated that while the present invention is primarily described herein with respect to a specific example of a digital network, namely a digital subscriber line (DSL) network, given the teachings of the present invention provided herein, one of ordinary skill in the related art may readily apply the present invention to any switched digital network while maintaining the scope of the present invention.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, an exemplary digital subscriber line (DSL) network is indicated generally by the reference numeral 100. Advantageously, the DSL network 100 is capable of creating, transmitting, and selecting application layer forward error correction (FEC) in accordance with the principles of the present invention.

The DSL network 100 includes a super-head end unit 110, a content distribution center 120, a video hub office or video service office and DSLAM (hereinafter "video hub") 130, a DSL loop 140, and customer premises equipment (CPE) 150.

The super-head end unit 110 includes an audio/video encoder 112, a closed caption generator 114, and a multiplexer (also referred to here as "mux" for short) 116. An output of the audio/video encoder 112 is connected in signal communication with a first input of the multiplexer 116. An output of the closed caption generator 114 is connected in signal communication with a second input of the multiplexer 116. A first output of the multiplexer 116 is connected in signal communication with a first input of the content distribution center 120. A second output of the multiplexer 116 is connected in signal communication with a second input of the content distribution center 120.

The video hub 130 includes a selection multiplexer 132. The selection multiplexer 132 has a first input (for audio/video flows) in signal communication with a first output of the content distribution center 120 and a second input (for multiple application layer FEC flows) in signal communication with a second output of the content distribution center 120. The selection multiplexer 132 has a third input in signal communication with an output of the DSL loop 140. The selection multiplexer has a fourth input in signal communication with an output of a local CC information generator 188.

An output of the video hub 130, corresponding to one of a plurality of DSL drops, is connected in signal communication with a video decoder with closed caption (CC) overlay capability included in the customer premise equipment 150. The customer premise equipment also includes a user interface having an output in signal communication with an input of the DSL loop 140.

FIG. 1 also illustrates the separate flows maintained for the Closed Captioning information along with separate flows for Audio, Video and other data information. At the DSLAM 130, based on the customer premises equipment (CPE) request, the appropriate CC information is switched into the selection multiplexer 132 that combines the appropriate audio, video and data streams to be switched to the various distribution points in the customer premises.

Advantageously, the present invention may be utilized to provide, e.g., closed caption information of any normal channel (possibly in multiple languages). Moreover, the present invention may be utilized such that closed caption information of the PIP channel can be switched into the normal channel flows and combined at the CPE 150 for display on the normal channel. Further, the present invention may be utilized such that any emergency Closed Captioning information can be locally inserted at the DSLAM 130 (local CC information can be generated and inserted at the DSLAM 130).

Figure 2:
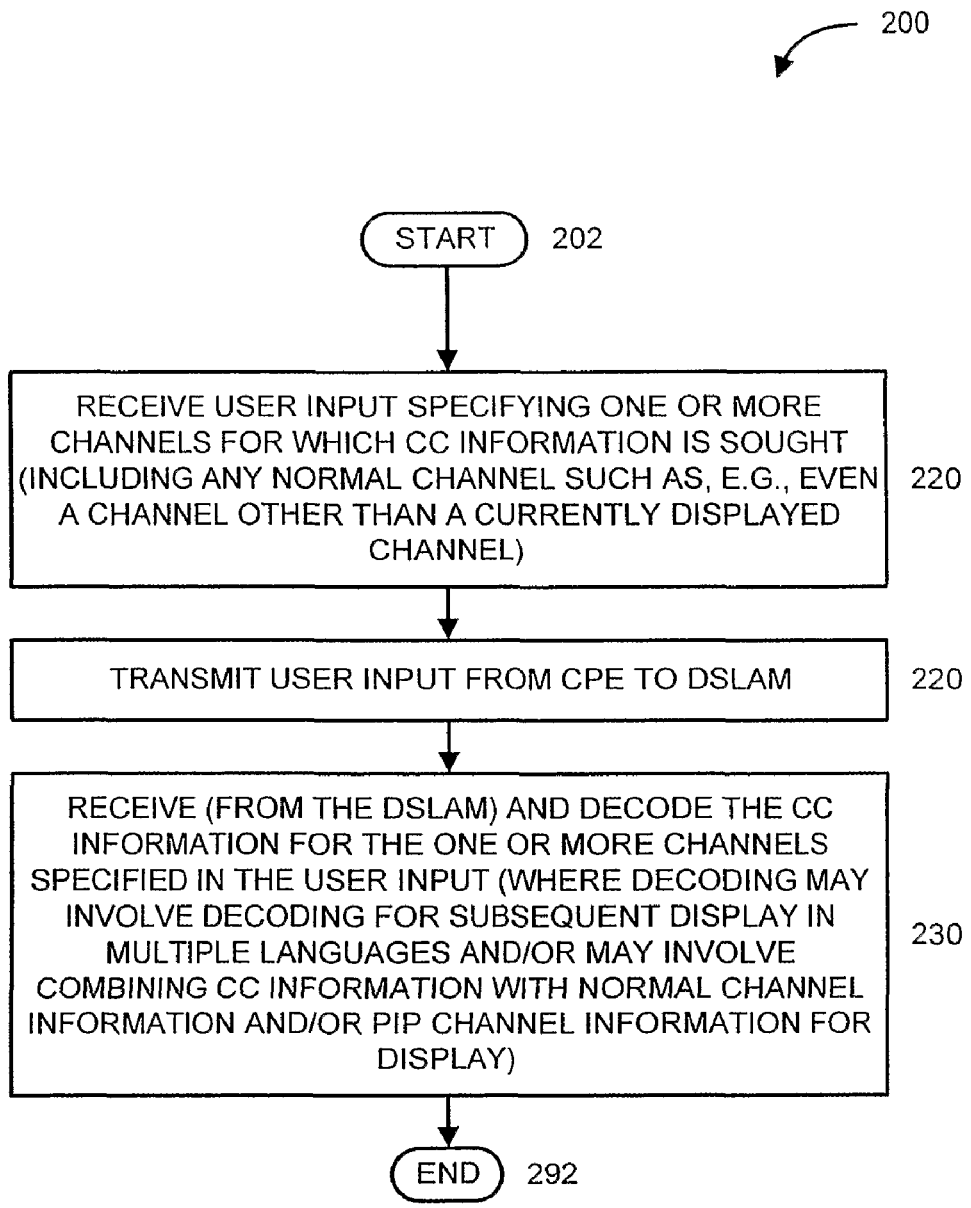
FIG. 2 is a flow diagram illustrating an exemplary method for decoding closed caption information in a customer premise equipment (CPE) device in accordance with the principles of the present invention.

Turning to FIG. 2, a method for decoding closed caption information in a customer premise equipment (CPE) device is indicated generally by the reference numeral 200. The CPE device 200 is for connecting to a Digital Subscriber Line (DSL) network.

A start block 202 passes control to a function block 210. The function block 210 receives a user input specifying one or more channels for which closed caption (CC) information is sought, and passes control to a function block 220. The one or more specified channels may include any normal channel, even including a channel other than a currently displayed channel.

The function block 220 transmits the user input from the CPE to the DSLAM, and passes control to a function block 230. The function block 230 receives, from the DSLAM, the CC information for the one or more channels specified by the user input, decodes the CC information, and passes control to an end block 292. The function block 230 may decode the CC information for display in multiple languages, depending upon the user input. Moreover, the function block 230 may combine the CC information with normal channel information and/or PIP channel information for display.

Figure 3:
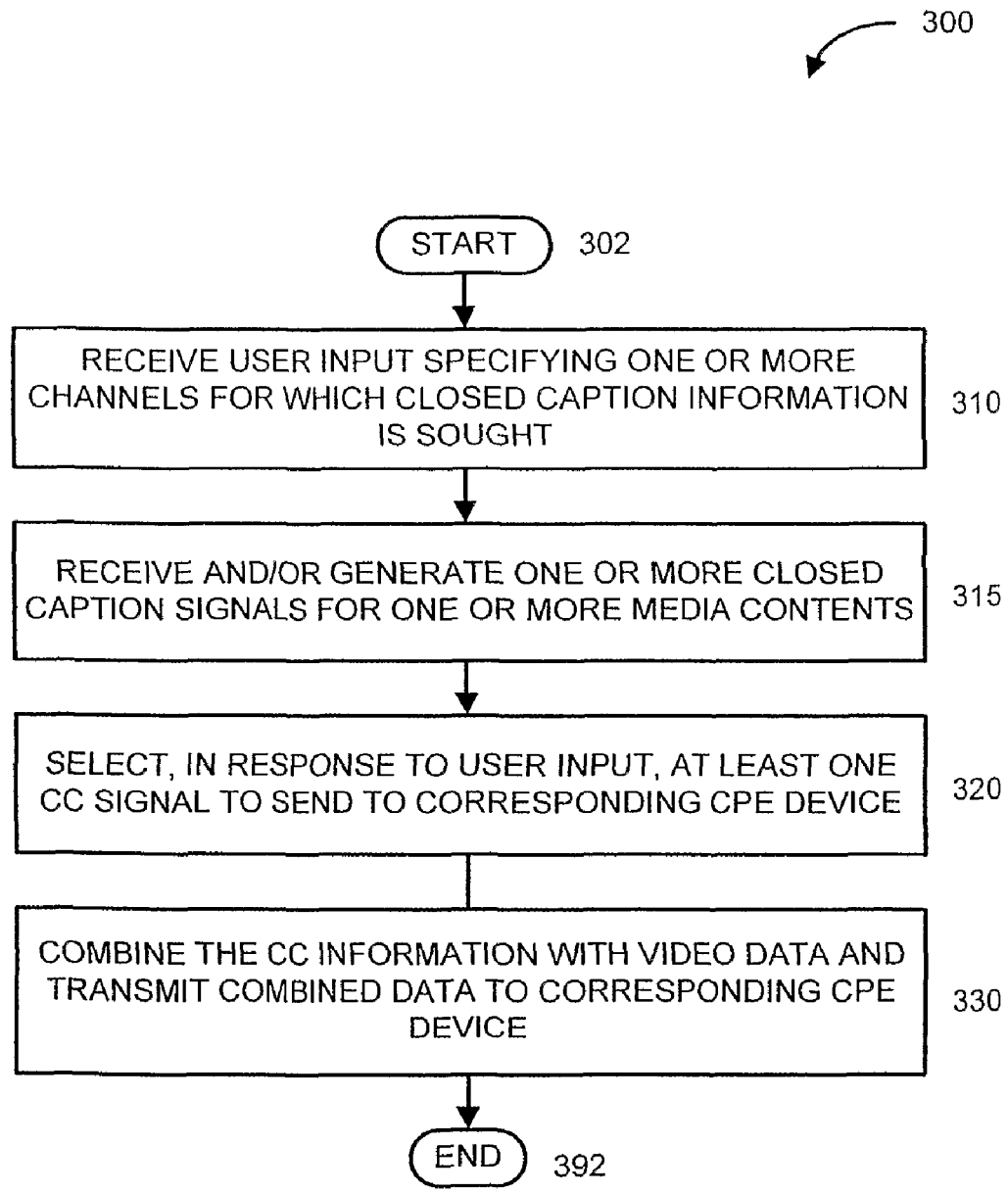
FIG. 3 is a flow diagram illustrating an exemplary method for distributing closed caption information from a Digital Subscriber Line Access Multiplexer (DSLAM) in accordance with the principles of the present invention.

Turning to FIG. 3, an exemplary method for distributing closed caption information from a Digital Subscriber Line Access Multiplexer (DSLAM) is indicated generally by the reference numeral 300. The DSLAM 300 is for connecting to a Digital Subscriber Line (DSL) network.

A start block 302 passes control to a function block 310. The function block 310 receives a user input transmitted from a CPE, the user input specifying one or more channels for which closed caption (CC) information is sought, and passes control to a function block 315.

The function block 315 receives and/or generates (including generating on demand) one or more closed caption (CC) signals for one or more media contents, and passes control to a function block 320.

The function block 320 selects, in response to the user input received from the CPE, at one least one of the CC signals to respectively send to each Customer Premise Equipment (CPE) device, and passes control to function block 330.

The function block 330 combines the CC information with video data prior to respectively transmitting the combined information to one of the CPE devices, and passes control to an end block 392.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A customer premise equipment (CPE) device for connecting to a digital network, the CPE device comprising:
    a user input device for transmitting a request to a digital subscriber line access multiplexer (DSLAM) that initiates a selection in the DLSAM of at least one closed caption (CC) signal from among a plurality of CC signals responsive to receiving a user input specifying one or more channels for which closed caption (CC) information is sought, the CC signal corresponding to the CC information; and
    a decoder for receiving the CC information for the one or more channels specified by the user input, and for overlaying the CC information for a particular one or the one or more channels on programming content that is to be displayed for another one of the one or more channels.

2. The CPE device according to claim 1, wherein the CC information is for any normal channel, including channels other than a currently displayed channel.

3. The CPE device according to claim 1, wherein said decoder combines the CC information with any one of normal channel information and PIP channel information for display.

4. The CPE device according to claim 1, wherein the CC information is received by said decoder in response to a signal sent by the CPE.

5. The CPE device according to claim 1, wherein the CC information is decoded in multiple languages.

6. The CPE device according to claim 1, wherein the digital network is a Digital Subscriber Line (DSL) network.

7. A method for receiving closed caption (CC) information in a customer premise equipment (CPE) device for connecting to a digital network, the method comprising the steps of:
    transmitting a request to a digital subscriber line access multiplexer (DSLAM) that initiates a selection in the DSLAM of at least one closed caption (CC) signal from among a plurality of CC signals responsive to a user input from the CPE specifying one or more channels for which closed caption (CC) information is sought;
    receiving the CC information for the one or more channels specified by the user input from the DSLAM; and
    overlaying the CC information for a particular one or the one or more channels on programming content that is to be displayed for another one of the one or more channels.

8. The method according to claim 7, wherein the CC information is for any normal channel, including channels other than a currently displayed channel.

9. The method according to claim 7, further comprising the step of combining the CC information with any one of normal channel information and PIP channel information for display.

10. The method according to claim 7, wherein the CC information is received in response to a signal sent by the CPE.

11. The method according to claim 7, wherein the CC information is decoded in multiple languages.

12. The method according to claim 7, wherein the digital network is a Digital Subscriber Line (DSL) network.

13. The CPE device according to claim 1, wherein the CC information for the particular one of the one or more channels corresponds to a particular sport, and the other one of the one or more channels corresponds to a different sport with respect to the particular sport.

14. The CPE device according to claim 13, wherein the other one of the one or more channels further corresponds to a picture-in-picture channel.

15. The method according to claim 7, wherein the CC information for the particular one of the one or more channels corresponds to a particular sport, and the other one of the one or more channels corresponds to a different sport with respect to the particular sport.

16. The method according to claim 15, wherein the other one of the one or more channels further corresponds to a picture-in-picture channel.

* * * * *